(12) United States Patent
Yilmaz et al.

(10) Patent No.: US 12,669,892 B2
(45) Date of Patent: Jun. 30, 2026

(54) TOUCH SENSOR AND TOUCH DEVICE

(71) Applicant: FLEXTOUCH TECHNOLOGIES CO., LTD., Tongxiang City (CN)

(72) Inventors: Esat Yilmaz, Tongxiang (CN); Zhongliang Wu, Tongxiang (CN); Yu Si, Tongxiang (CN); Li Kang, Tongxiang (CN); Grant Yang, Tongxiang (CN); Jonathan Jiang, Tongxiang (CN)

(73) Assignee: FLEXTOUCH TECHNOLOGIES CO., LTD., Tongxiang City (CN)

( * ) Notice: Subject to any disclaimer, the term of this patent is extended or adjusted under 35 U.S.C. 154(b) by 0 days.

(21) Appl. No.: 19/169,425

(22) Filed: Apr. 3, 2025

(65) Prior Publication Data

US 2025/0328205 A1      Oct. 23, 2025

(30) Foreign Application Priority Data

Apr. 19, 2024      (CN) .......................... 202410481442.6

(51) Int. Cl.
　*G06F 3/041*　　　(2006.01)
　*G06F 3/044*　　　(2006.01)
　*G06F 3/046*　　　(2006.01)

(52) U.S. Cl.
　CPC .......... *G06F 3/04164* (2019.05); *G06F 3/044* (2013.01); *G06F 3/046* (2013.01)

(58) Field of Classification Search
　None
　See application file for complete search history.

(56) References Cited

U.S. PATENT DOCUMENTS

2025/0077017 A1 *    3/2025    Kang .................... G06F 3/0412

* cited by examiner

*Primary Examiner* — Ifedayo B Iluyomade
(74) *Attorney, Agent, or Firm* — HSML.P.C.

(57) ABSTRACT

The present disclosure provides a touch sensor which includes a touch area including at least a plurality of first touch channels, and a non-touch area located at a side of the touch area. The non-touch area includes at least a plurality of first signal traces. The first signal traces connected to the first touch channels are different from each other. A first resistance mismatch degree between first resistances corresponding to the plurality of first touch channels is less than or equal to a resistance mismatch degree threshold, and/or a first capacitance mismatch degree between first capacitances corresponding to the plurality of first touch channels is less than or equal to a capacitance mismatch degree threshold.

20 Claims, 3 Drawing Sheets

A

TOUCH SENSOR AND TOUCH DEVICE

CROSS-REFERENCE TO RELATED APPLICATIONS

This application claims priority to Chinese Patent Application No. 202410481442.6, entitled "TOUCH SENSOR AND TOUCH DEVICE" and filed on Apr. 19, 2024, the entire contents of which are incorporated herein by reference.

TECHNICAL FIELD

The present disclosure relates to the field of touch technologies, and in particular, to a touch sensor and a touch device.

BACKGROUND

With the rapid progress of science and technology and the sweep of intelligent waves, touch technology has gradually evolved from an early innovative concept to an indispensable means of interaction in modern life, and has been widely penetrated into various smart devices such as smartphones, tablet computers, smart wearables, vehicle-mounted displays, public information terminals, and even smart homes. In the face of increasingly diversified and refined user requirements as well as continuous expansion of application scenarios, improving the performance of touch devices to make them more accurate, sensitive, stable, and easy to manipulate is related to the improvement of user experience and is also the key to promoting continuous innovation and upgrading of related industries.

SUMMARY

One aspect of the present disclosure provides a touch sensor. The touch sensor includes a touch area including at least a plurality of first touch channels, and a non-touch area located at a side of the touch area. The non-touch area includes at least a plurality of first signal traces, wherein the first signal traces connected to the first touch channels are different from each other. A first resistance mismatch degree between first resistances corresponding to the plurality of first touch channels is less than or equal to a resistance mismatch degree threshold, and/or a first capacitance mismatch degree between first capacitances corresponding to the plurality of first touch channels is less than or equal to a capacitance mismatch degree threshold. The first resistance includes a channel resistance of the first touch channel, and a trace resistance of the first signal trace connected to the first touch channel. The first capacitance includes a channel capacitance of the first touch channel, and a parasitic capacitance between the first signal trace connected to the first touch channel and the remaining first signal traces.

In some embodiments, a width of at least a portion of at least part of the first signal traces is positively correlated with length of the first signal trace.

In some embodiments, the first signal trace includes at least a plurality of signal trace segments. For a same first signal trace, a width of a target signal trace segment is positively correlated with the length of the first signal trace, and widths of the remaining signal trace segments are the same and less than the width of the target signal trace segment. The target signal trace segment includes at least one of the plurality of signal trace segments.

In some embodiments, for a same first touch channel, two ends of the first touch channel are respectively connected to a touch drive circuit through the first signal trace, and a width of at least part of the first signal traces is positively correlated with a first length of the same first signal trace, where the first length is a total length of the first signal trace connected to the two ends of the first touch channel.

In some embodiments, the touch sensor includes a plurality of sets of first signal traces, and each set includes at least one first signal trace. A length difference between the first signal traces in each set is less than a length threshold. Widths of the first signal traces in a same set are the same. The plurality of sets of first signal traces include at least a first set of signal traces and a second set of signal traces. Lengths of the first signal traces in the first set of signal traces are greater than those of the first signal traces in the second set of signal traces, and widths of the first signal traces in the first set of signal traces are greater than those of the first signal traces in the second set of signal traces.

In some embodiments, the resistance mismatch degree threshold ranges from 1% to 50%, and a width of the first signal trace ranges from 5 μm to 100 μm.

In some embodiments, the first resistance mismatch degree is a ratio of a first maximum resistance difference to a minimum value among the plurality of first resistances, where the first maximum resistance difference is a difference between a maximum value among the plurality of first resistances and the minimum value among the plurality of first resistances.

In some embodiments, at least part of pairs of adjacent first signal traces defines a spacing, and at least a portion of the spacing is positively correlated with a length of at least one first signal trace of the pair of the first signal traces.

In some embodiments, the capacitance mismatch degree threshold ranges from 1% to 50%, and a spacing between two adjacent first signal trace ranges from 5 μm to 200 μm.

In some embodiments, the first capacitance mismatch degree is a ratio of a first maximum capacitance difference to a minimum value among the plurality of first capacitances, where the first maximum capacitance difference is a difference between a maximum value among the plurality of first capacitances and the minimum value among the plurality of first capacitances.

In some embodiments, in each two adjacent first signal traces, a spacing between the two adjacent first signal traces is positively correlated with a width of at least one of the two adjacent first signal traces.

In some embodiments, each two adjacent first signal traces, the spacing between the two adjacent first signal traces is greater than or equal to a width of one of the two adjacent first signal traces.

In some embodiments, the touch area further includes a plurality of second touch channels, and the first touch channels and the second touch channels have different channel types, and the non-touch area further includes second signal traces. Each of the second touch channels is connected to a touch drive circuit through the second signal trace. The second signal traces connected to the second touch channels are different from each other. A second resistance mismatch degree between second resistances corresponding to the plurality of second touch channels is less than or equal to the resistance mismatch degree threshold, and/or a second capacitance mismatch degree between second capacitances corresponding to the plurality of second touch channels is less than or equal to the capacitance mismatch degree threshold. The second resistance includes a channel resistance of the second touch channel, and a trace resistance of the second signal trace connected to the second touch channel. The second capacitance includes a channel capacitance of the second touch channel, and a parasitic capacitance between the second signal trace connected to the second touch channel and the remaining second signal traces.

In some embodiments, the plurality of first touch channels extend along a first direction respectively and are arranged along a second direction, and the plurality of second touch channels extend along the second direction respectively and are arranged along the first direction. The plurality of first signal traces are located at at least one side of the touch area in the first direction and at a first side of the touch area in the second direction. The plurality of second signal traces are located at at least one side of the touch area in the first direction and at two opposite sides of the touch area in the second direction. The touch drive circuit is located at the first side of the touch area in the second direction.

In some embodiments, widths of the first signal traces are positively correlated with lengths of the first signal traces, and widths of the second signal traces are the same.

In some embodiments, the first signal traces include first signal traces A and first signal traces B. A first end of each of the first touch channels is connected to a touch drive circuit through the first signal trace A, and a second end of each of the first touch channels is connected to the touch drive circuit through the first signal trace B. The first signal traces A connected to the first touch channels are different from each other, and the first signal traces B connected to the first touch channels are different from each other. The first resistance corresponding to each of the first touch channels includes a channel resistance corresponding to the first touch channel, a trace resistance of the first signal trace A connected to the first touch channel, and a trace resistance of the first signal trace B connected to the first touch channel.

In some embodiments, the first touch channel includes a capacitive touch channel and/or an electromagnetic touch channel.

Another second aspect of the present disclosure provides a touch device including the touch sensor according to any one of the embodiments described above.

The details of the various embodiments of the present disclosure will be illustrated with the accompanying drawings and description below, based on which, other features, problems to be solved, and beneficial effects of the disclosure will be readily understood by those skilled in the art.

BRIEF DESCRIPTION OF THE DRAWINGS

In order to more clearly illustrate the technical solutions in embodiments of the present disclosure or the conventional art, the accompanying drawings used in the description of the embodiments or the conventional art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION

Figure 1:
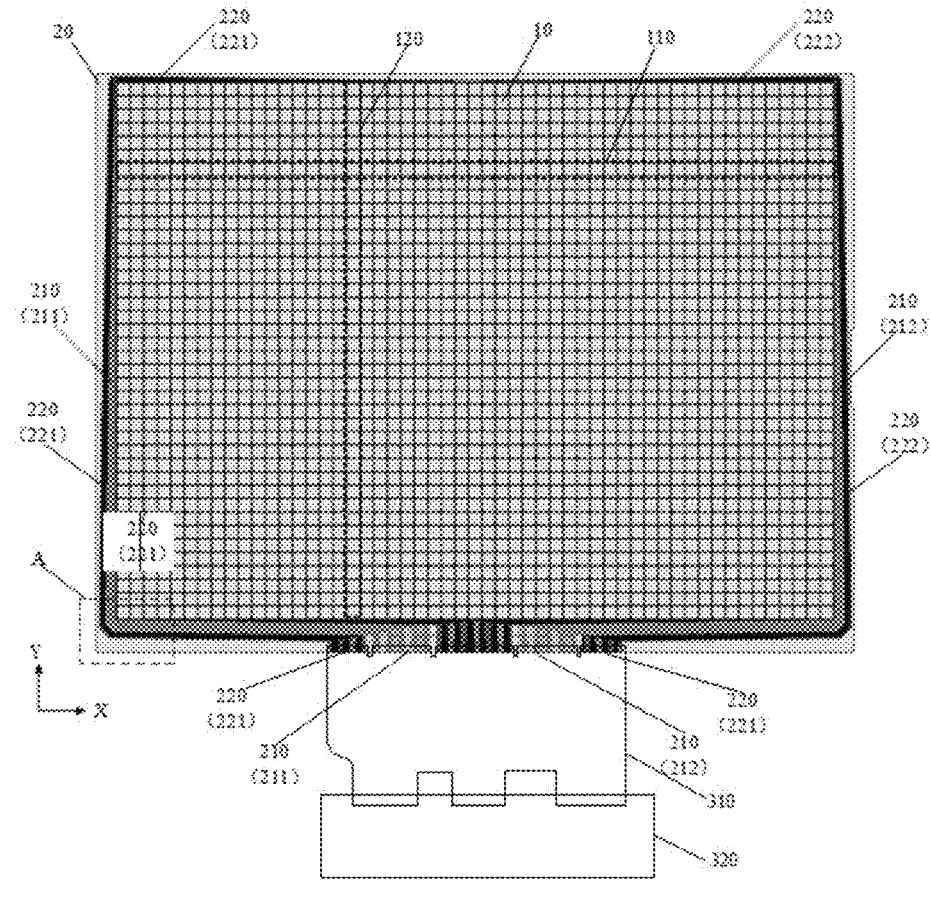
FIG. 1 is a schematic structural diagram of a touch sensor according to an embodiment.

To facilitate understanding of the present disclosure, a more comprehensive description of the present disclosure will be given below with reference to the relevant accompanying drawings. Preferred embodiments of the present disclosure are given in the drawings. However, the present disclosure may be implemented in many different forms and is not limited to the embodiments described herein. Rather, these embodiments are provided to make the contents disclosed in the present disclosure more fully understood.

Unless defined otherwise, all technical and scientific terms used herein have the same meanings as would generally understood by those skilled in the technical field of the present disclosure. The terms used herein in the specification of the present disclosure are for the purpose of describing specific embodiments only, and are not intended to limit the present disclosure.

It may be understood that the terms such as "first" and "second" used in the present disclosure may be used herein to describe various elements, but the elements are not limited by the terms. The terms are only intended to distinguish one element from another element. For example, without departing from the scope of the present disclosure, a first touch channel may be referred to as a second touch channel, and similarly, a second touch channel may be referred to as a first touch channel. Both the first touch channel and the second touch channel are touch channels, but they are not the same touch channel.

It may be understood that "connection" in the following embodiments should be understood as "electrical connection" or "communication connection" if the connected circuits, modules, or units have electrical signal or data transmission between each other.

It may be understood that "at least one" means one or more, and "a plurality of" means two or more. "At least part of an element" means part or all of the element. In use, the singular forms of "a/an", "one" and "the" may also include plural forms, unless otherwise clearly indicated in the context. It should be further understood that the terms "include/comprise" or "have" specify the presence of the features, integers, steps, operations, components, portions, or their combinations, but may not exclude the presence or addition of one or more of other features, integers, steps, operations, components, portions, or their combinations. At the same time, the term "and/or" used in the specification may include any and all combinations of related listed items.

The touch technology may include a capacitive touch technology and an electromagnetic touch technology. Electromagnetic touch is favored for features such as professional drawing and fine control, which generally requires an electromagnetic pen for touch input, but performance thereof is easily affected by traces inside a sensor and impedance consistency between channels. When there is a significant difference in impedance between different channels, it may lead to uneven distribution of touch signals, which is manifested as an obvious gradient change from one channel to another channel. This imbalance may directly damage a linear response capability of the system, that is, a relationship between input and output no longer maintains an ideal linear relationship, thereby affecting accurate calculation of touch positions. At the same time, decreased accuracy means that a user may have a positioning deviation when performing a fine operation, which cannot accurately achieve an expected pen-touch action. In addition, degradation in signal quality is also reflected in non-uniformity of an SNR (Signal-to-Noise Ratio), and there may be high noise interference in local regions, further deteriorating touch experience and causing problems such as jitter, discontinuity, or a recognition error of a touch trajectory.

Similar problems also exist in capacitive touch sensors, especially when hybrid input from finger touch and a stylus is required to be taken into account. Capacitive touch relies on detecting small changes in capacitance formed between a conductor (such as a finger or a specialized stylus tip) and a surface of a sensor, and any factor that affects accuracy of capacitance measurement may have a negative impact on overall performance. Like electromagnetic touch, an internal circuit layout of a capacitive sensor and impedance matching between channels are also critical. Impedance inconsistency may lead to deviations in capacitance readings, causing nonlinearity in touch response, reduced positioning accuracy, and uneven distribution of SNRs, all of which may be visible in the case of a finger operation or use of a capacitive stylus, affecting interactive experience of the user, especially in application scenarios that require high-precision touch such as fine drawing and handwritten notes.

Similar problems also exist in capacitive and electromagnetic hybrid touch sensors, especially touch sensors that combine finger capacitive touch and electromagnetic pen touch, which may also have the above technical defects when affected by traces inside the sensors and impedance consistency between channels.

In summary, regardless of the electromagnetic or capacitive touch technology, it is crucial to ensure that traces in the sensor are designed properly and impedances between channels are highly matched, especially in applications that support hybrid touch input. This is the basis for ensuring that the touch sensor has excellent linearity, high precision, and a high SNR, thereby providing the user with an accurate, smooth, and interference-free touch interaction experience.

Concerning the above problems, the present disclosure provides a touch sensor and a touch device, which can increase an impedance match degree of the touch sensor, thereby improving touch performance.

Embodiments of the present disclosure provide a touch sensor. The touch sensor may be at least one of a capacitive touch sensor and an electromagnetic touch sensor, or may be a hybrid sensor of capacitive touch and electromagnetic touch. The touch sensor may be applied to a touch device. The touch device may be, but is not limited to, various personal computers, laptops, smartphones, tablet computers, digital panels, Internet of Things devices, and portable wearable devices. The Internet of Things devices may be smart speakers, smart TVs, smart air conditioners, smart vehicle-mounted devices, and the like. The portable wearable devices may be smart watches, smart bracelets, head-mounted devices, and the like.

In an embodiment, as shown in FIG. 1, a touch sensor is provided. The touch sensor includes a touch area 10 and a non-touch area 20. The touch area 10 refers to a specific area on a touch device where a user may interact through direct contact (such as a finger, a stylus, or other touch input tools). The touch area 10 includes at least a plurality of first touch channels 110. The first touch channels 110 refer to a touch structure that provides a touch function for the touch sensor. The first touch channels 110 include, but are not limited to, driving electrodes (Tx), sensing electrodes (Rx), or the like, which are not specifically limited herein. Exemplarily, the first touch channels 110 may extend along a first direction in the touch area 10 and be arranged along a second direction. The first direction is different from the second direction. Exemplarily, in FIG. 1, the first direction is an X-axis direction, and the second direction is a Y-axis direction. A number of the first touch channels 110 may be set according to factors such as a touch requirement of the touch sensor and a size of the touch sensor, which is not specifically limited herein. The first touch channel 110 may be made of, but is not limited to, a metal material such as silver, copper, or aluminum, indium tin oxide (ITO), or other suitable materials, which is not specifically limited herein.

The non-touch area 20 is located at a side of the touch area 10. Exemplarily, the non-touch area 20 is located on at least one side of the touch area 10. For example, in FIG. 1, the non-touch area 20 is located on a peripheral side of the touch area 10. The non-touch area 20 refers to an area around the touch area 10 or inside the touch sensor that does not have any touch sensing capability. The non-touch area 20 includes at least a plurality of first signal traces 210. Each first touch channel 110 is connected to a touch drive circuit 320 through the first signal traces 210. The touch drive circuit 320 may be, for example, independent of the touch sensor, and is connected to the first signal traces 210 through a connector 310, such as an FPC (flexible printed circuit). The first signal traces 210 connected to the first touch channels 110 are different from each other, i.e., the first touch channels 110 are connected to respective first signal traces 210. Exemplarily, at least one end of each first touch channel 110 is connected to the touch drive circuit 320 through the first signal trace 210. For example, in FIG. 1, two ends of each first touch channel 110 are respectively connected to the touch drive circuit 320 through the first signal trace 210. The touch drive circuit 320 is configured to drive the first touch channel 110 through signal transmission on the first signal trace 210 to support a touch function. Exemplarily, the touch drive circuit 320 is a touch drive chip (touch IC). Exemplarily, the touch sensor further includes a plurality of solder pads. Each solder pad is correspondingly connected to the first signal trace and the touch drive circuit 320 respectively. Therefore, the connection between the first touch channel 110 and the touch drive circuit 320 is realized through the first signal trace 210 and the solder pad. The first signal trace 210 may be made of any suitable conductive material such as metallic silver, copper, or aluminum, which is not specifically limited herein.

A first resistance mismatch degree between first resistances corresponding to the plurality of first touch channels 110 is less than or equal to a resistance mismatch degree threshold. The first resistance includes a channel resistance of the first touch channel 110, and a trace resistance of the first signal trace 210 connected to the first touch channel 110. Specifically, it may be expressed by a mathematical expression as: $R1=Rmesh1+Rtrace1$, where R1 denotes the first resistance, Rmesh1 denotes the channel resistance of the first touch channel 110, and Rtrace1 denotes the trace resistance of the first signal trace 210 connected to the first touch channel 110. In the application, overall structures of the first touch channels 110 are the same, and channel resistances Rmesh1 of the first touch channels 110 are approximately equal to each other.

Figure 2:
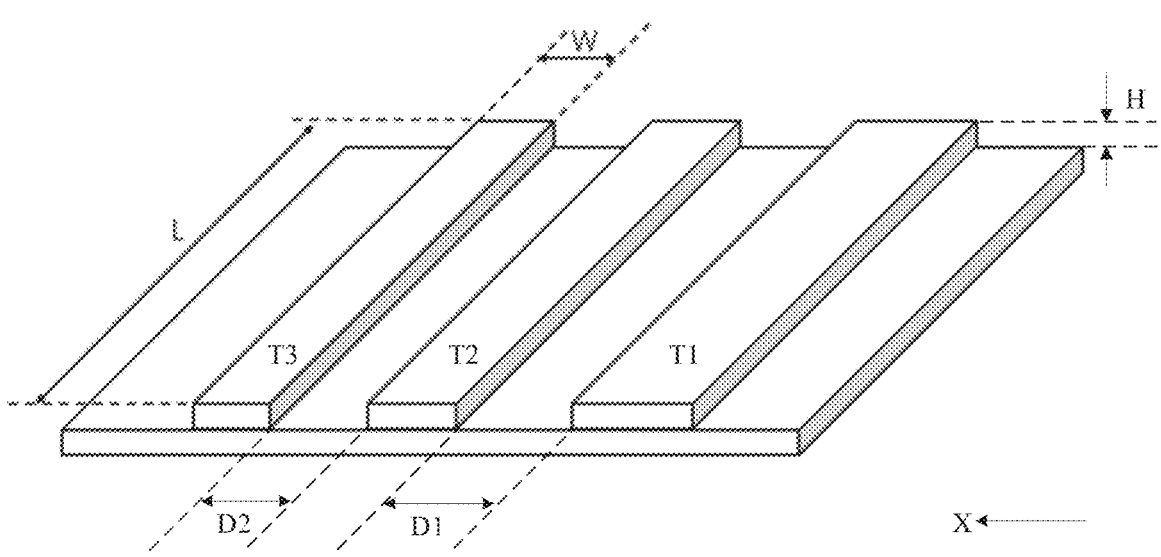
FIG. 2 is a schematic structural diagram of a plurality of first signal traces according to an embodiment.

Referring to the structure shown in FIG. 2, the trace resistance of the first signal trace may be expressed by a mathematical expression as: $Rtrace1=(\rho*L)/(W*H)$, where Rtrace1 denotes the trace resistance of the first signal trace, ρ denotes a resistivity, L denotes a length, W denotes a width, and H denotes a thickness. Based on this, it may be understood that under a condition that the first signal traces 210 are made of a same material and have a same thickness, a resistance value of the first signal trace 210 is positively correlated with a length of the first signal trace 210, and the resistance value of the first signal trace 210 is negatively correlated with a width of the first signal trace 210. Based on this, the width of the first signal trace 210 can be adjusted to reduce a resistance difference caused by a length difference between the plurality of first signal traces 210. The first resistance mismatch degree is used to represent a degree of difference between the first resistances corresponding to the plurality of first touch channels 110, that is, a degree of difference between a plurality of R1. The resistance mismatch degree threshold is preset, which may be set according to the touch type of the touch sensor and a touch accuracy requirement, etc., and is not specifically limited in the embodiments of the present disclosure.

A first capacitance mismatch degree between first capacitances corresponding to the plurality of first touch channels 110 is less than or equal to a capacitance mismatch degree threshold. The first capacitance includes a channel capacitance of the first touch channel 110, and a parasitic capacitance between the first signal trace 210 connected to the first touch channel 110 and the remaining first signal traces 210. Specifically, it may be expressed by a mathematical expression as: C1=Cmesh1+Ctrace1, where C1 denotes the first capacitance, Cmesh1 denotes the channel capacitance of the first touch channel 110, and Ctrace1 denotes the parasitic capacitance between the first signal trace 210 connected to the first touch channel 110 and the remaining first signal traces 210. The first capacitance mismatch degree is used to represent a degree of difference between the first capacitances corresponding to the plurality of first touch channels 110, that is, a degree of difference between a plurality of C1. The capacitance mismatch degree threshold is preset, which may be set accordingly according to the touch type of the touch sensor and a touch accuracy requirement, etc., and is not specifically limited in the embodiments of the present disclosure.

In actual applications, different touch application scenarios correspond to different touch drives. Therefore, some touch sensors only require that the first resistance mismatch degree is less than or equal to the resistance mismatch degree threshold, some touch sensors only require that the first capacitance mismatch degree is less than or equal to the capacitance mismatch degree threshold, and some touch sensors require that the first resistance mismatch degree is less than or equal to the resistance mismatch degree threshold and require that the first capacitance mismatch degree is less than or equal to the capacitance mismatch degree threshold, so as to eliminate resistance and/capacitance differences caused by length differences to achieve high-precision touch performance. It can be understood that, the touch sensor only requiring that the first resistance mismatch degree is less than or equal to the resistance mismatch degree threshold may further require that the first capacitance mismatch degree is less than or equal to the capacitance mismatch degree threshold. Similarly, the touch sensor only requiring that the first capacitance mismatch degree is less than or equal to the capacitance mismatch degree threshold may further require that the first resistance mismatch degree is less than or equal to the resistance mismatch degree threshold. That is, whether the first resistance mismatch degree is less than or equal to the resistance mismatch degree threshold or the first capacitance mismatch degree is less than or equal to the capacitance mismatch degree threshold, it is conducive to further achieving higher-precision touch performance. A combination thereof can achieve optimal touch performance.

The touch sensor provided in this embodiment includes a touch area provided with a plurality of first touch channels and a non-touch area provided with a plurality of first signal traces. Each first touch channel is connected to a touch drive circuit 320 through the first signal trace, and the first signal traces connected to the first touch channels are different from each other. A first resistance mismatch degree between first resistances corresponding to the plurality of first touch channels is less than or equal to a resistance mismatch degree threshold, and/or a first capacitance mismatch degree between first capacitances corresponding to the plurality of first touch channels is less than or equal to a capacitance mismatch degree threshold. Moreover, the first resistance includes the channel resistance of the first touch channel, and the trace resistance of the first signal trace connected to the first touch channel. The first capacitance includes the channel capacitance of the first touch channel, and the parasitic capacitance between the first signal trace connected to the first touch channel and the remaining first signal traces. This indicates that a difference between the first resistances corresponding to the plurality of first touch channels is small, and/or a difference between the first capacitances corresponding to the plurality of first touch channels is small. That is, a match degree between the first resistances corresponding to the plurality of first touch channels is maintained within a stable matching range, and/or a match degree between the first capacitances corresponding to the plurality of first touch channels is maintained within a stable matching range. In this way, when the touch drive circuit 320 drives the first touch channels through signal transmission on the first signal traces to achieve touch control, influences of the difference between the first resistances and/or the difference between the first capacitances on touch performance can be reduced, so as to improve touch performance such as linearity, touch accuracy, an SNR, and other touch indexes.

Figure 3:
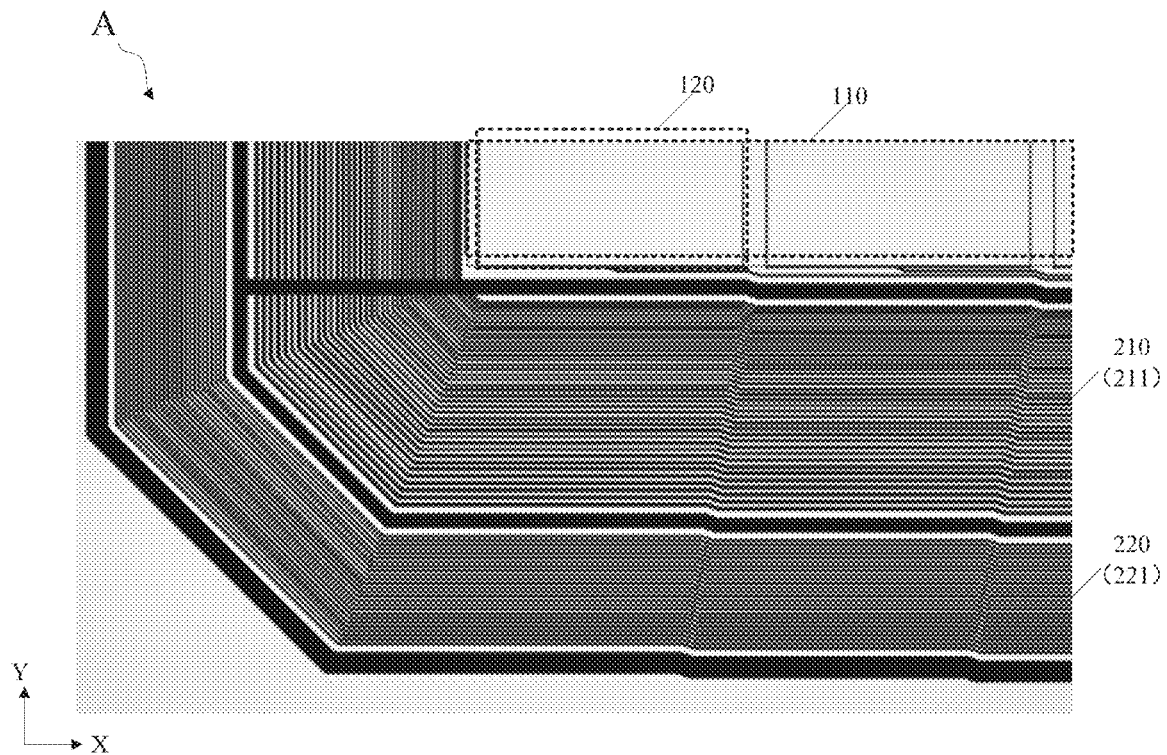
FIG. 3 is a schematic structural diagram of a region A in FIG. 1 according to an embodiment.

In an embodiment, a width of at least a portion of at least part of the plurality of first signal traces 210 is positively correlated with lengths of the first signal traces 210. That is, a width of a portion of one first signal trace 210, e.g., a segment of one first signal trace 210 is positively correlated with a length of the same first signal trace 210, or an overall width of one first signal trace 210 is positively correlated with the length of the same first signal trace 210. At least one of the plurality of first signal traces 210 satisfies that a width of at least a portion thereof is positively correlated with the length thereof. Specifically, for the same first signal trace 210, the first signal trace with a larger length indicates that the width of at least a portion of the first signal trace 210 is greater, and the first signal trace 210 with a smaller length indicates that the width of at least a portion of the first signal trace 210 is smaller. FIG. 3 is a schematic structural diagram of region A in FIG. 1. Referring to FIG. 3, the width of the first signal trace 210 is positively correlated with the length of the first signal trace 210, the first signal trace 210 with a long length has a larger width, the first signal trace 210 with a medium length has a medium width, and the first signal trace 210 with a short length has a smaller width. Exemplarily, the first resistance of each trace may specifically be calculated and determined using a mathematical expression based on the above trace resistance, thereby matching and determining the width of each trace.

According to the touch sensor provided in the embodiments of the present disclosure, there are differences in distances between the plurality of first touch channels 110 and the touch drive circuit 320, resulting in differences in the lengths of the first signal traces 210 corresponding to the first touch channels 110. Under a same condition, a longer signal trace corresponds to a greater trace resistance. Therefore, in the touch sensor provided in the embodiments of the present disclosure, the width of at least a portion of at least part of the first signal traces 210 are correspondingly designed according to the lengths of the first signal traces 210, that is, the width of at least a portion of at least part of the first signal traces 210 are positively correlated with the length of the first signal trace 210. Therefore, the resistance difference caused by the length difference can be eliminated by increasing the width of at least a portion of the first signal trace 210 with a larger length and reducing the width of at least a portion of the first signal trace 210 with a smaller length, to meet a requirement for a resistance match degree between the first resistances corresponding to the first touch channels 110, thereby achieving high-precision touch performance.

Figure 4:
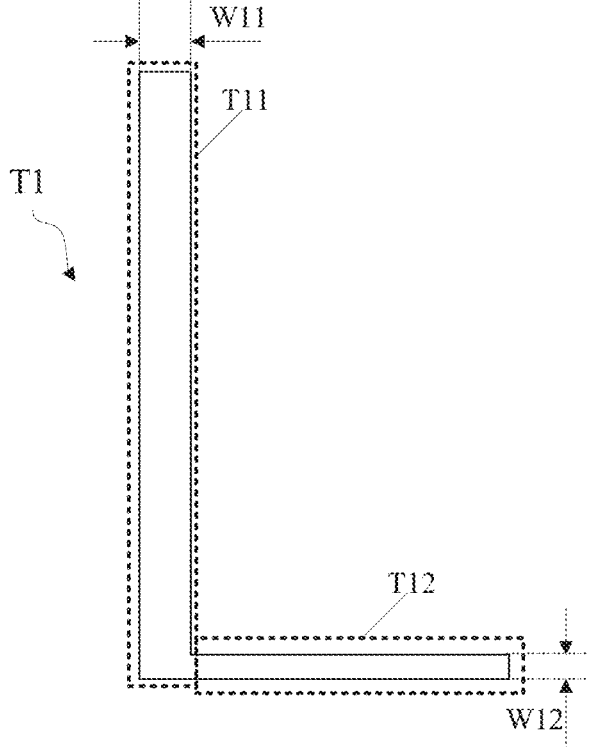
FIG. 4 is a schematic structural diagram of a first signal trace according to an embodiment.

In an embodiment, as shown in FIG. 4, the same first signal trace 210 includes at least a plurality of signal trace segments. The signal trace segments correspond to different trace ranges of the same first signal trace 210. That is, the signal trace segments do not overlap with each other. For a same first signal trace 210, a width of a target signal trace segment is positively correlated with the length of the first signal trace 210, and widths of the remaining signal trace segments are the same and less than the width of the target signal trace segment. The target signal trace segment includes at least one of the plurality of signal trace segments. Taking the first signal trace T1 shown in FIG. 2 as an example, the first signal trace T1 includes a first signal trace segment T11 and a second signal trace segment T12. A width W11 of the first signal trace segment T11 is positively correlated with a length of the first signal trace T1, and a width W12 of the second signal trace segment T12 is less than the width W11 of the first signal trace segment T11, i.e., W12<W11.

It is to be noted that FIG. 4 is merely exemplary. In the application, the first signal trace 210 may be segmented according to the wiring of the first signal traces 210, and the wiring in the non-touch area 20, etc., and at least one segment is selected for width adjustment based on a design requirement (such as a narrow bezel) of the touch sensor. For example, within an area with an ample wiring space in the non-touch area 20, widths of a plurality of first signal traces 210 are designed differently, and within an area with a narrow wiring space, widths of a plurality of first signal traces 210 are designed identically, which reduces resistance differences caused by length differences between the first signal traces and improves touch performance, while enhancing flexibility and allowing the sensor structure to be applicable in multiple scenarios.

In an embodiment, still referring to FIG. 1, for a same first touch channel 110, two ends of the first touch channel 110 are respectively connected to the touch drive circuit 320 through the first signal trace 210. Taking the structure shown in FIG. 1 as an example, the two ends of the first touch channel 110 in the first direction, i.e., the X-axis direction, are respectively connected to the first signal trace 210. A width of at least a portion of the first signal trace 210 is positively correlated with a first length. The first length is a total length of the first signal trace 210 connected to the two ends of the first touch channel 110. Based on the above formula, the first resistance includes the channel resistance of the first touch channel 110 and the trace resistances of all the first signal traces 210 connected to the first touch channel 110. Based on this, the widths of the first signal traces 210 on at least one side connected to the first touch channels 110 may be adjusted. For example, for the structure shown in FIG. 1, according to the first length, the widths of at least part of the first signal traces 210 on the left side of the first touch channels 110 may be set differentially and the widths of the first signal traces 210 on the right side of the first touch channels 110 may be set identically. In this way, while the resistance match degree between the first touch channels 110 is improved, the first signal traces 210 may be selected for local width adjustment according to an actual application scenario of the touch sensor, which improves the applicability of the touch sensor and can further reduce the complexity of the process.

In an embodiment, the touch sensor includes a plurality of sets of first signal traces 210, and each set of first signal traces 210 includes at least one first signal trace 210. The plurality of sets of first signal traces 210 include at least a first set of signal traces and a second set of signal traces. A length difference between the first signal traces 210 in each set is less than a length threshold. The length threshold is preset and may be correspondingly set according to an application scenario of the touch sensor, which is not specifically limited herein. Exemplarily, the length threshold may be determined based on a resistance difference. For example, the resistance difference is limited to 1% or 2% or 5%, and then the length threshold is obtained for grouping. The first signal traces 210 in the same set have a same width. Each set includes at least one first signal trace 210, which may include one first signal trace 210 or a plurality of first signal traces 210. The number of the first signal traces 210 included in each set may specifically be determined according to the length difference between the first signal traces 210. A length of the first signal trace 210 in the first set is greater than that of the first signal trace 210 in the second set, and a width of the first signal trace 210 in the first set is greater than that of the first signal trace 210 in the second set. For example, the length threshold is set to 2 cm, a length range of the first set of signal traces is 38 cm to 40 cm, and a length range of the second set of signal traces is 36 cm to 38 cm. Widths of the first set of signal traces are the same and are 30 μm, and widths of the second set of signal traces are the same and are 40 μm.

In the application, the plurality of first signal traces 210 included in the touch sensor may be classified into multiple groups according to the length difference and the length threshold thereof, which is not limited to the above classification of the first set of signal traces and the second set of signal traces, and may also include other sets of signal traces. Widths of the signal traces in the same set are set identically, and the width of the first signal trace 210 in the set with a larger length is greater than the width of the first signal trace 210 in the set with a smaller length.

According to the touch sensor provided in the embodiments of the present disclosure, the plurality of first signal traces 210 included in the touch sensor may be grouped according to the lengths of the plurality of first signal traces 210. Since the length difference between the first signal traces 210 in the same set is less than the length threshold, under a condition that channel resistances are the same and thicknesses of the signal traces are the same, the first resistance mismatch degree between the first resistances due to the length difference between the first signal traces 210 in the same set is smaller. Therefore, the widths of the first signal traces 210 in the same set may be set identically. The length difference between the first signal traces 210 in different sets is greater than or equal to the length threshold, resulting in a larger first resistance mismatch degree between the first resistances corresponding to the first signal traces 210 in different sets. Therefore, the width of the first signal trace 210 in the set with a larger length is set to be larger, and the width of the first signal trace 210 in the set with a smaller length is set to be smaller, so as to reduce the resistance difference between the first signal traces 210 in different sets caused by the length difference and improve the resistance match degree between the first signal traces 210, thereby improving touch performance of the touch sensor.

In an embodiment, the first resistance mismatch degree is a ratio of a first maximum resistance difference to a minimum value among the first resistances corresponding to the plurality of first touch channels 110. The first maximum resistance difference is a difference between a maximum value among the first resistances corresponding to the plurality of first touch channels 110 and the minimum value among the first resistances corresponding to the plurality of first touch channels 110. Specifically, it may be expressed by a mathematical expression as: $\lambda R_1 = (R_{1max} - R_{1min})/R_{1min}$, where $\lambda R_1$ denotes the first resistance mismatch degree, $R_{1max}$ denotes the maximum value among the first resistances corresponding to the plurality of first touch channels 110, and $R_{1min}$ denotes the minimum value among the first resistances corresponding to the plurality of first touch channels 110.

It may be understood that the first maximum resistance difference reflects a maximum difference between the first resistances corresponding to the plurality of first touch channels 110. Therefore, the ratio of the first maximum resistance difference to the minimum value among the plurality of first resistances is that the first resistance mismatch degree reflects a maximum degree of resistance mismatch between the first resistances corresponding to the plurality of first touch channels 110. Based on this, if the first resistance mismatch degree is less than or equal to the resistance mismatch degree threshold, it indicates that the resistance mismatch degree between the first resistances corresponding to the first touch channels 110 is less than or equal to the resistance mismatch degree threshold, thereby meeting a requirement for the resistance match degree.

In an embodiment, the resistance mismatch degree threshold ranges from 1% to 50%, which may be, for example, 10%, 20%, 25%, 30%, 35%, 40%, or the like, or any other values ranging from 1% to 50%. That is, the first resistance mismatch degree between the first resistances corresponding to the plurality of first touch channels 110 is less than or equal to 1% to 50%, which may be, for example, 10%, 20%, 25%, 30%, 35%, 40%, or the like, or any other values ranging from 1% to 50%. It may be understood that a first resistance match degree between the first resistances corresponding to the plurality of first touch channels 110 is equal to a difference between one and the first resistance mismatch degree. For example, if the first resistance mismatch degree between the first resistances corresponding to the plurality of first touch channels 110 is less than or equal to 1%, the first resistance match degree between the plurality of first resistances is greater than or equal to 99%.

In the application, the first resistance mismatch degree threshold may be set according to a touch requirement. Consequently, the width of the first signal trace 210 may be adjusted according to the first resistance mismatch degree threshold, such that the resistance match degree between the first resistances corresponding to the plurality of first touch channels 110 meets the touch requirement. For example, devices based on electromagnetic touch sensors and capacitive and electromagnetic hybrid touch sensors, such as digital panels that use stylus pens for touch interaction and computers and tablets that use fingers and stylus pens for touch interaction, have higher requirements for touch accuracy, so the resistance mismatch degree threshold may be set to a small value, such as 1%, to achieve better touch performance.

In an embodiment, the width of the first signal trace 210 ranges from 5 μm to 100 μm. For example, the width of the first signal trace 210 may be 10 μm, 25 μm, 50 μm, 75 μm, 90 μm, or the like, or any other suitable value from 5 μm to 100 μm. Based on this, the width of the first signal trace 210 may be adjusted within a certain range, so as to increase the resistance match degree between the first resistances corresponding to the plurality of the first touch channels 110, thereby improving the touch performance of the touch sensor. In the application, the width of the first signal trace 210 may be specifically determined according to factors such as process technology, product size, and the requirement of the touch drive circuit 320.

A low match degree between the first resistances corresponding to the plurality of first touch channels 110 may reduce the touch performance of the touch sensor. Specifically, the difference in the first resistance may cause potential differences of the touch channels to be different, that is, a uniform signal plane cannot be formed, and the signal from one touch channel to another channel may change unevenly or stepwise. In this way, touch linearity, accuracy, and SNR uniformity can be directly affected. An uneven signal plane may directly affect the response to a touch event, such as a touch force, a touch speed, and other sensing deviations, which also makes it difficult to achieve some complex touch events, may also directly cause a deviation between an identified position and an actual touch position, reducing the accuracy, and may further directly result in touch instability and uneven SNR distribution, thereby affecting the touch experience.

Therefore, the first resistance mismatch degree between the first resistances corresponding to the plurality of first touch channels being less than or equal to the resistance mismatch degree threshold can effectively eliminate the difference between the potential differences of the touch channels and form a uniform signal plane, so that signals of each channel are kept uniform, thereby improving touch performance such as touch linearity, accuracy, and SNR.

A low match degree between the first capacitances corresponding to the plurality of first touch channels 110 may reduce the touch performance of the touch sensor. Specifically, firstly, a first capacitance difference may cause uneven sensitivity of the touch sensor. That is, the sensitivity of the touch sensor is inconsistent in different areas. An area with a large capacitance value may require a larger capacitance change (i.e., a more noticeable touch action) to reach a threshold that triggers a touch event, while an area with a low capacitance value may overreact to slight touches. The uneven sensitivity may cause the user to experience different operating force requirements in different areas of the touch sensor, reducing the consistency of the touch experience. Secondly, the difference in the first capacitance may cause the system to reduce its capabilities to distinguish a plurality of simultaneous touch events. Due to inconsistency between the plurality of first capacitances, capacitance change amplitude caused by different contacts may vary greatly, making it difficult for the system to accurately separate and quantify contributions of the contacts when multi-point signals are processed, which may lead to misidentification or a multi-touch control coordinate calculation error. Thirdly, the difference in the first capacitance may reduce the SNR, and the difference in the first capacitance may cause the SNR of each touch electrode to be inconsistent. The SNR is an important index to measure a ratio of touch signal strength to background noise, which directly affects touch accuracy and stability. Areas with larger capacitance values may have higher SNRs due to relatively smaller noise, while areas with smaller capacitance values may have lower SNRs due to relatively larger noise. Uneven distribution of the SNRs may cause significant differences in touch performance in different areas of the sensor.

Therefore, the first capacitance mismatch degree between the first capacitances corresponding to the plurality of first touch channels is less than or equal to the capacitance mismatch degree threshold, which can effectively improve the uniformity of sensitivity of the touch sensor and ensure consistency of the touch experience. At the same time, the capabilities to distinguish the touch events, especially a plurality of simultaneous touch events, can be improved. In addition, the SNR can be increased, the influence of noise is reduced, and touch accuracy and stability are ensured.

In addition, a simulation of parasitic capacitances between signal traces under conditions of different line widths and different line spacings is performed. Table 1 shows that, based on the comparison between the parasitic capacitance 0.779 pF of the first set where both the line width and the line spacing are 30 μm and the parasitic capacitance 0.831 pF of the second set where the line width is 40 μm and the line spacing is 30 μm under a same length, the adjustment of the widths of the signal traces may affect the parasitic capacitance between the signal traces. Specifically, increasing the widths of the signal traces may cause the parasitic capacitance between the signal traces to increase. To this end, the line spacing can be increased to reduce the parasitic capacitance between the signal traces. That is, when the line width and the line spacing are adjusted to 40 μm, the parasitic capacitance is 0.778 pF, realizing the basically same parasitic capacitance values of the first set before the adjustment and the third set and after the adjustment.

TABLE 1

| | | | |
|---|---|---|---|
| Simulation data of parasitic capacitances between signal traces with different line widths and line spacings | | | |
| | Line width | Line spacing | Parasitic capacitance |
| First set | 30 μm | 30 μm | 0.779 pF |
| Second set | 40 μm | 30 μm | 0.831 F |
| Third set | 40 μm | 40 μm | 0.778 F |

In an embodiment, the first capacitance mismatch degree is a ratio of a first maximum capacitance difference to a minimum value among the first capacitances corresponding to the plurality of first touch channels 110. The first maximum capacitance difference is a difference between a maximum value among the first capacitances corresponding to the plurality of first touch channels 110 and the minimum value among the first capacitances corresponding to the plurality of first touch channels 110. Specifically, it may be expressed by a mathematical expression as: $\lambda C_1 = (C_{1max} - C_{1min})/C_{1min}$, where $\lambda C_1$ denotes the first capacitance mismatch degree, $C_{1max}$ denotes the maximum value among the first capacitances corresponding to the plurality of first touch channels 110, and $C_{1min}$ denotes the minimum value among the first capacitances corresponding to the plurality of first touch channels 110.

It may be understood that the first maximum capacitance difference reflects a maximum difference between the first capacitances between the plurality of first touch channels 110. Therefore, the ratio of the first maximum capacitance difference to the minimum value among the plurality of first capacitances, i.e., the first capacitance mismatch degree reflects a maximum degree of capacitance mismatch between the first capacitances corresponding to the plurality of first touch channels 110. Based on this, if the first capacitance mismatch degree is less than or equal to the capacitance mismatch degree threshold, it indicates that the capacitance mismatch degree between the first capacitances corresponding to the first touch channels 110 is less than or equal to the capacitance mismatch degree threshold, that is, the first capacitances match each other, thereby meeting a requirement for the capacitance match degree.

In an embodiment, the touch sensor includes a plurality of pairs of first signal traces 210, and each pair of first signal traces 210 includes two first signal traces 210 arranged adjacently. The plurality of pairs of first signal traces 210 include at least a first pair of signal traces and a second pair of signal traces. A maximum length of the two adjacent first signal traces 210 in the first pair of signal traces is greater than that of the two adjacent first signal traces 210 in the second pair of signal traces, and a spacing between the two adjacent first signal traces 210 in the first pair of signal traces is greater than a spacing between the two adjacent first signal traces 210 in the second pair of signal traces.

For example, the touch sensor shown in FIG. 2 includes three first signal traces T1, T2, and T3 arranged at intervals along the first direction, that is, the X-axis direction. In some embodiments, lengths of the three first signal traces T1, T2, and T3 decrease in sequence. For example, the three first signal traces T1, T2, and T3 are arranged side by side in sequence from the outside to the inside, where T1 is located on the outermost side and is the longest, while T3 is located on the innermost side and is the shortest. The first pair of signal traces includes first signal traces T1 and T2, and the second pair of signal traces includes first signal traces T2 and T3. The length of the first signal trace T1 in the first pair of signal traces is maximum and is 40 cm, and the length of the first signal trace T2 in the second pair of signal traces is maximum and is 38 cm. A spacing D1 between the first signal trace T1 and the first signal trace T2 in the first pair of signal traces is greater than a spacing D2 between the first signal trace T2 and the first signal trace T3 in the second pair of signal traces, that is, D1>D2.

It is to be noted that FIG. 2 is merely exemplary. In the application, according to factors such as trace directions and wiring positions of the plurality of first signal traces 210, two adjacent first signal traces 210 form a pair of first signal traces 210, and thus a plurality of pairs of first signal traces 210 can be obtained. The number of pairs of the first signal traces 210 is specifically determined according to factors such as the number of the first signal traces 210 and the wiring direction of the first signal traces 210, and a spacing between the two adjacent first signal traces 210 according to each pair of first signal traces 210 is defined.

According to the touch sensor provided in the embodiments of the present disclosure, two first signal traces 210 arranged adjacently in the plurality of first signal traces 210 are grouped into a pair of first signal traces 210. For two pairs of first signal traces 210, a spacing between one pair of first signal traces 210 with a larger maximum length is set to a larger value, and a spacing between the other pair of first signal traces 210 with a smaller maximum length is set to a smaller value. That is, the pair of signal traces with a larger length has a larger spacing, and the pair of signal traces with a smaller length has a smaller spacing. Therefore, when the channel capacitances corresponding to the first touch channels 110 are the same, the spacing between the first signal traces 210 is adjusted, so that the first capacitance mismatch degree between the plurality of first capacitances is less than or equal to the capacitance mismatch degree threshold, thereby increasing the first capacitance match degree between the plurality of first capacitances to improve the touch performance of the touch sensor.

In an embodiment, in pairs of first signal traces 210, a spacing of at least a portion of at least part of the pairs of two adjacent first signal traces 210 is positively correlated with a length of at least one first signal traces 210 of the pair of two adjacent first signal traces 210. Among the plurality of pairs of signal traces of the touch sensor, there may be a pair of first signal traces 210, of which a part of the spacing and/or an overall spacing is positively correlated with the length thereof, or there may be a plurality of pairs of first signal traces 210, each defining a part of a spacing and/or an overall spacing that is positively correlated with the length thereof. At least part of the spacing between the two adjacent first signal traces 210 may be part of the spacing between the two adjacent first signal traces 210, or may be the overall spacing between the two adjacent first signal traces 210. At least part of the spacing between the two adjacent first signal traces 210 may be positively correlated with the length of any one thereof, or may be positively correlated with the lengths of the two adjacent first signal traces 210 respectively. That is, if a line length of the two adjacent first signal traces 210 (i.e., the length of at least one of the first signal traces 210) is greater, the spacing between the two adjacent first signal traces 210 is greater. If the line length of the two adjacent first signal traces 210 (i.e., the length of at least one of first signal traces 210) is smaller, the spacing between the two adjacent first signal traces 210 is smaller. Exemplarily, the spacing between the two adjacent first signal traces 210 may specifically be determined through circuit simulation. That is, the first capacitance value corresponding to each trace is determined through specific circuit layout simulation, thereby matching and determining the spacing. The first capacitance may alternatively be calculated through a corresponding theoretical formula, thereby matching and determining the spacing.

In the embodiments of the present disclosure, the adjustment of the spacing between the two adjacent first signal traces 210 is intended to make the first capacitance mismatch degree between the plurality of first capacitances in the touch sensor less than or equal to the capacitance mismatch degree threshold, that is, the first capacitances corresponding to the plurality of first touch channels match each other. In the application, specifically, which pair of first signal traces 210 is to be selected for spacing adjustment and how to adjust the spacing between the two adjacent first signal traces 210 may be flexibly designed according to an actual scenario, a touch matching requirement, or the like, which is not limited herein.

According to the touch sensor provided in the above embodiment, since the parasitic capacitance between the two adjacent first signal traces 210 is positively correlated with the length of at least one of the two adjacent first signal traces 210, in the embodiments of the present disclosure, the spacing of at least part of the pairs of adjacent first signal traces 210 is adjusted according to the length of at least one first signal traces 210 of the pair of two adjacent first signal traces 210, so that the first capacitances corresponding to the plurality of first touch channels match each other, thereby improving the touch performance of the touch sensor.

In an embodiment, in each two adjacent first signal traces 210, a spacing between the two adjacent first signal traces 210 is positively correlated with a width of at least one of the two adjacent first signal traces 210. That is, in an embodiment, for the same pair of first signal traces 210, a spacing between the two adjacent first signal traces 210 in the pair of first signal traces 210 is positively correlated with a width of at least one first signal trace 210 in the pair of first signal traces 210. Exemplarily, in each two adjacent first signal traces 210, the spacing between the two adjacent first signal traces 210 is greater than or equal to the width of one of the two adjacent first signal traces 210, so as to ensure that an influence of trace width adjustment on the mismatch degree of the first capacitance can be sufficiently mitigated. For example, in each two adjacent first signal traces 210, the spacing between the two adjacent first signal traces 210 may be the width of one first signal trace 210 in the two adjacent first signal traces 210, or an average value of the widths of the two first signal traces 210, or a sum of the width of one first signal trace 210 in the two adjacent first signal traces 210 and a width parameter, or a sum of the average value of the widths of the two first signal traces 210 and the width parameter. The width parameter may be a fixed constant determined based on the influence of trace width adjustment on the first capacitance mismatch degree. In the application, the spacing between the two adjacent first signal traces 210 is set to be greater than the width of one of the two adjacent traces 210. For example, the spacing between two adjacent first signal traces 210 is set to a sum of the width of one first signal trace 210 of the two adjacent first signal traces 210 and the width parameter or a sum of the average value of the widths of the two first signal traces 210 and the width parameter, which can fully mitigate the influence of trace width adjustment on the first capacitance mismatch degree, achieve capacitance matching on the basis of resistance matching, and further improve the touch performance.

Taking the structure shown in FIG. 1 as an example, for the plurality of first signal traces 210 at the left side of the first touch channel 110, each two adjacent first signal traces 210 are grouped into a pair along a negative direction of the X-axis such that a plurality of pairs of first signal traces 210 are obtained, and the spacing of each pair of first signal traces 210 is set to the width of the first signal trace 210 from the pair which is closer to the first touch channel 110. The plurality of first signal traces 210 at the right side of the first touch channel 110 are grouped into a pair along a positive direction of the X-axis such that a plurality of pairs of first signal traces 210 are obtained, and the spacing of each pair of first signal traces 210 is set to the width of the first signal trace 210 from the pair which is closer to the first touch channel 110.

It is to be noted that, in the application, for the structure shown in FIG. 1, the two ends of the first touch channel 110 are connected to the first signal traces 210 respectively, and the first signal traces 210 on one side may be selected for spacing adjustment. For example, spacings corresponding to a plurality of pairs of first signal traces 210 on the left side are set differently, and spacings corresponding to a plurality of pairs of first signal traces 210 on the right side are set identically. The foregoing are merely exemplary descriptions. The spacing adjustment is intended to make the first capacitance mismatch degree between the first capacitances corresponding to the plurality of first touch channels 110 less than or equal to the capacitance mismatch degree threshold. Whether to adjust the spacing of each pair of first signal traces 210 and how to adjust the spacing of a pair of first signal traces 210 may be specifically based on a design requirement of the touch sensor, such as a design requirement for a narrow bezel. For an area with an ample wiring space in the non-touch area 20, spacings of pairs of first signal traces are designed differently, and for an area with a narrow wiring space, spacing of pairs of first signal traces are designed identically, which reduces the first capacitance difference between the first capacitances corresponding to the plurality of first touch channels 110 and further improves the touch performance. This configuration also has a high flexibility and is applicable to touch sensor structures in multiple scenarios.

In an embodiment, the capacitance mismatch degree threshold ranges from 1% to 50%, which may be, for example, 10%, 20%, 25%, 30%, 35%, 40%, or the like, or any other values ranging from 1% to 50%. That is, the first capacitance mismatch degree between the first capacitances corresponding to the plurality of first touch channels 110 is less than or equal to 1% to 50%, which may be, for example, 10%, 20%, 25%, 30%, 35%, 40%, or the like, or any other values ranging from 1% to 50%. It may be understood that a first capacitance match degree between the first capacitances corresponding to the plurality of first touch channels 110 is equal to a difference between one and the first capacitance mismatch degree. For example, if t the first capacitance mismatch degree between the first capacitances corresponding to the plurality of first touch channels 110 is less than or equal to 10%, the first capacitance match degree between the plurality of first capacitances is greater than or equal to 90%.

In the application, the first capacitance mismatch degree threshold may be set according to a touch requirement, so that the spacing of a pair of first signal traces 210 may be adjusted according to the first capacitance mismatch degree threshold, and the capacitance match degree between the first capacitances corresponding to the plurality of first touch channels 110 meets the touch requirement. For example, devices based on electromagnetic touch sensors and capacitive and electromagnetic hybrid touch sensors, such as digital panels that use stylus pens for touch interaction and computers and tablets that use fingers and stylus pens for touch interaction, have higher requirements for touch accuracy, so the capacitive mismatch degree threshold may be set to a small value, such as 1%, to achieve better touch performance.

In an embodiment, for the same pair of signal traces, a spacing between two adjacent first signal traces 210 in the pair of signal traces ranges from 5 μm to 200 μm. For example, the spacing may be 10 μm, 20 μm, 25 μm, 50 μm, 60 μm, 75 μm, 90 μm, 100 μm, 120 μm, 150 μm, 180 μm, or the like, or any other suitable value from 5 μm to 200 μm. Based on this, the spacing between two adjacent first signal traces 210 in a pair of signal traces may be adaptively adjusted within a certain range, so as to further increase, on the basis of mutual matching between the plurality of first resistances, the capacitance match degree between the first capacitances corresponding to the plurality of the first touch channels 110, and increase an impedance match degree corresponding to a plurality of first touch channels 110, thereby improving touch performance of the touch sensor. In the application, the spacing between two adjacent first signal traces 210 in a pair of signal traces may be specifically determined according to factors such as process technology, product size, and the requirement of the touch drive circuit 320.

It may be understood that specifically based on a design requirement for the touch sensor such as a design requirement for a narrow bezel, for an area with an ample wiring space in the non-touch area 20, spacings of pairs of first signal traces are designed differently, and for an area with a narrow wiring space, spacings of pairs of first signal traces are designed identically, which reduces the capacitive difference between first capacitances corresponding to the plurality of first touch channels 110 and further improves touch performance. This configuration also has a high flexibility and is applicable to touch sensor structures in multiple scenarios.

In an embodiment, still referring to FIG. 1, the touch area 10 includes a plurality of first touch channels 110 and a plurality of second touch channels 120. The first touch channel 110 and the second touch channel 120 have different channel types. Exemplarily, the first touch channel 110 is a driving channel, and the second touch channel 120 is a sensing channel. In other words, the first touch channel 110 is a touch channel formed by driving electrodes Tx, and the second touch channel 120 is a touch channel formed by sensing electrodes Rx. Similarly, the first touch channel 110 may be a touch channel formed by sensing electrodes Rx, and the second touch channel 120 may be a touch channel formed by driving electrodes Tx. The types of touch channels may be specifically determined according to an application scenario.

Exemplarily, the second touch channels 120 may extend along the second direction in the touch area 10 and be arranged along the first direction. The first direction is different from the second direction. Exemplarily, in FIG. 1, the first direction is an X-axis direction, and the second direction is a Y-axis direction. A number of the second touch channels 120 may be set according to factors such as the touch requirement of the touch sensor and the size of the touch sensor, which is not specifically limited herein. The second touch channel 120 may be made of, but is not limited to, a metal material such as silver, copper, or aluminum, indium tin oxide (ITO), or other suitable materials, which is not specifically limited herein.

The non-touch area 20 includes a plurality of first signal traces 210 and a plurality of second signal traces 220. Each second touch channel 120 is connected to the touch drive circuit 320 through the second signal trace 220. The second signal traces 220 connected to the second touch channels 120 are different from each other. Exemplarily, at least one end of each second touch channel 120 is connected to the touch drive circuit 320 through the second signal trace 220. For example, in FIG. 1, two ends of each second touch channel 120 are respectively connected to the touch drive circuit 320 through the second signal traces 220. Exemplarily, the touch sensor further includes a plurality of solder pads. Each solder pad is correspondingly connected to the second signal trace and the touch drive circuit 320. Therefore, the connection between the second touch channel 120 and the touch drive circuit 320 is realized through the second signal trace 220 and the solder pad. The second signal trace 220 may be made of any suitable conductive material such as metallic silver, copper, or aluminum, which is not specifically limited herein.

A second resistance mismatch degree between second resistances corresponding to the plurality of second touch channels 120 is less than or equal to the resistance mismatch degree threshold. Exemplarily, the first resistance mismatch degree corresponding to the plurality of first touch channels 110 on a same layer and the second resistance mismatch degree corresponding to the plurality of second touch channels 120 on a same layer are respectively less than or equal to the resistance mismatch degree threshold. The second resistance includes a channel resistance of the second touch channel 120, and a trace resistance of the second signal trace 220 connected to the second touch channel 120. Specifically, it may be expressed by a mathematical expression as: $R_2 = R_{mesh2} + R_{trace2}$, where $R_2$ denotes the second resistance, $R_{mesh2}$ denotes the channel resistance of the second touch channel 120, and $R_{trace2}$ denotes the trace resistance of the second signal trace 220 connected to the second touch channel 120. The second resistance mismatch degree is used to represent a degree of difference between the second resistances corresponding to the plurality of second touch channels 120, that is, a degree of difference between a plurality of $R_2$. The resistance mismatch degree threshold is preset, which may be set according to factors such as the touch type of the touch sensor and a touch accuracy requirement, and is not specifically limited in the embodiments of the present disclosure.

A second capacitance mismatch degree between second capacitances corresponding to the plurality of second touch channels 120 is less than or equal to the capacitance mismatch degree threshold. Exemplarily, the first capacitance mismatch degree corresponding to the plurality of first touch channels 110 on a same layer and the second capacitance mismatch degree corresponding to the plurality of second touch channels 120 on a same layer are respectively less than or equal to the capacitance mismatch degree threshold. The second capacitance includes a channel capacitance of the second touch channel 120, and a parasitic capacitance between the second signal trace 220 connected to the second touch channel 120 and the remaining second signal traces 220. Specifically, it may be expressed by a mathematical expression as: $C_2 = C_{mesh2} + C_{trace2}$, where $C_2$ denotes the second capacitance, $C_{mesh2}$ denotes the channel capacitance of the second touch channel 120, and $C_{trace2}$ denotes the parasitic capacitance between the second signal trace 220 connected to the second touch channel 120 and the remaining second signal traces 220. The second capacitance mismatch degree is used to represent a degree of difference between the second capacitances corresponding to the plurality of second touch channels 120, that is, a degree of difference between a plurality of $C_2$. The capacitance mismatch degree threshold is preset, which may be set according to factors such as the touch type of the touch sensor and a touch accuracy requirement, and is not specifically limited in the embodiments of the present disclosure.

In actual applications, different touch application scenarios correspond to different touch drives. Therefore, some touch sensors only require that the second resistance mismatch degree is less than or equal to the resistance mismatch degree threshold, some touch sensors only require that the second capacitance mismatch degree is less than or equal to the capacitance mismatch degree threshold, and some touch sensors require that the second resistance mismatch degree is less than or equal to the resistance mismatch degree threshold and the second capacitance mismatch degree is less than or equal to the capacitance mismatch degree threshold, so as to eliminate resistance and/capacitance differences caused by length differences to achieve high-precision touch performance. It can be understood that, the touch sensor only requiring that the second resistance mismatch degree is less than or equal to the resistance mismatch degree threshold may further require that the second capacitance mismatch degree is less than or equal to the capacitance mismatch degree threshold. Similarly, the touch sensor only requiring that the second capacitance mismatch degree is less than or equal to the capacitance mismatch degree threshold may further require that the second resistance mismatch degree is less than or equal to the resistance mismatch degree threshold. That is, whether the second resistance mismatch degree is less than or equal to the resistance mismatch degree threshold or the second capacitance mismatch degree is less than or equal to the capacitance mismatch degree threshold, it is conducive to further achieving higher-precision touch performance. A combination thereof can achieve optimal touch performance.

In the application, for a touch sensor provided with the first touch channel 110 and the second touch channel 120, according to touch performance requirements of the touch sensor, for any of the first touch channel 110 and the second touch channel 120, resistance matching and/or capacitance matching can be selected. That is, for the first touch channel 110 in the touch sensor, the first resistance mismatch degree is less than or equal to the resistance mismatch degree threshold, and/or the first capacitance mismatch degree is less than or equal to the capacitance mismatch degree threshold. For the second touch channel 120 in the touch sensor, the second resistance mismatch degree is less than or equal to the resistance mismatch degree threshold, and/or the second capacitance mismatch degree is less than or equal to the capacitance mismatch degree threshold. For example, for the same touch sensor, the first resistance mismatch degree and the second resistance mismatch degree thereof are respectively less than or equal to the resistance mismatch degree threshold, and the first capacitance mismatch degree and the second capacitance mismatch degree are respectively less than or equal to the capacitance mismatch degree threshold. That is, various touch channels in the touch sensor match in impedance.

The touch sensor provided in the embodiments of the present disclosure includes a touch area 10 and a non-touch area 20. The touch area 10 is provided with a plurality of first touch channels 110 and a plurality of second touch channels 120. The non-touch area 20 is provided with a plurality of first signal traces 210 and a plurality of second signal traces 220. Each first touch channel 110 is connected to a touch drive circuit through the first signal trace 210, and each second touch channel 120 is connected to the touch drive circuit 320 through the second signal trace 220. A first resistance mismatch degree between first resistances corresponding to the plurality of first touch channels 110 is less than or equal to a resistance mismatch degree threshold, and/or a first capacitance mismatch degree between first capacitances corresponding to the plurality of first touch channels 110 is less than or equal to a capacitance mismatch degree threshold. A second resistance mismatch degree between second resistances corresponding to the plurality of second touch channels 120 is less than or equal to the resistance mismatch degree threshold, and/or a second capacitive mismatch degree between second capacitances corresponding to the plurality of second touch channels 120 is less than or equal to the capacitance mismatch degree threshold. The first resistance includes a channel resistance of the first touch channel and a trace resistance of the first signal trace connected to the first touch channel. The first capacitance includes a channel capacitance of the first touch channel, and a parasitic capacitance between the first signal trace connected to the first touch channel and the remaining first signal traces. The second resistance includes a channel resistance of the second touch channel, and a trace resistance of the second signal trace connected to the second touch channel. The second capacitance includes a channel capacitance of the second touch channel, and a parasitic capacitance between the second signal trace connected to the second touch channel and the remaining second signal traces. In this way, a difference between the first resistances is small, and/or a difference between the first capacitances is small. In addition, a difference between the second resistances is small, and/or a difference between the second capacitances is small. That is, a match degree between the first resistances and/or a match degree between the first capacitances are/is higher than a certain match threshold and is within a stable matching range, and a match degree between the second resistances and/or a match degree between the second capacitances are/is higher than a certain match threshold and is within a stable certain matching range. That is, the resistances and/or capacitances corresponding to the touch channels of the same type have a higher match degree. In this way, when the touch drive circuit 320 drives the first touch channels 110 through signal transmission on the first signal traces 210 and drives the second touch channels 120 through signal transmission on the second signal traces 220 to jointly achieve touch control, influences of the difference between the first resistances and/or the first capacitances and the difference between the second resistances and/or the second capacitances on touch performance can be reduced, so as to improve touch performance such as linearity, touch accuracy, an SNR, and other touch indexes.

In an embodiment, among the plurality of second signal traces 220, a width of at least a portion of at least part of the second signal traces 220 is positively correlated with a length of the corresponding second signal trace 220. That is, a width of at least a portion of the same second signal trace 220 is positively correlated with a length of the second signal trace 220, or an overall width of the same second signal trace 220 is positively correlated with the length of the second signal trace 220. At least one second signal trace 220 in the touch sensor satisfies that a width of at least a portion of the second signal trace 220 is positively correlated with a length of the second signal trace 220. Specifically, for the same second signal trace 220, the longer the second signal trace is, the greater the width of at least a portion of the second signal trace is, and the shorter the second signal trace is, the smaller the width of at least a portion of the second signal trace is.

According to the touch sensor provided in the embodiments of the present disclosure, there are differences in distances between the plurality of second touch channels 120 and the touch drive circuit 320, resulting in differences in the lengths of the second signal traces 220 corresponding to the second touch channels 120. Under a same condition, a longer signal trace corresponds to a greater trace resistance. Therefore, in the touch sensor provided in the embodiments of the present disclosure, the widths of at least part of the second signal traces 220 are designed according to the lengths of the second signal traces 220, that is, the widths of at least part of the second signal traces 220 are positively correlated with the lengths of the same second signal traces 220. Therefore, the resistance difference caused by the length difference can be eliminated by increasing the widths of at least part of the second signal traces 220 with larger lengths and reducing the widths of at least part of the second signal traces 220 with smaller lengths, to meet a requirement for a resistance match degree between the second resistances corresponding to the second touch channels 120, thereby achieving high-precision touch performance.

In an embodiment, the second signal trace 220 includes at least a plurality of second signal trace segments 220. For a same second signal trace 220, a width of a target second signal trace segment 220 is positively correlated with a length of the second signal trace 220, and widths of the remaining second signal trace segments 220 are the same and less than the width of the target second signal trace segment 220. The target second signal trace segment 220 includes at least one of the plurality of second signal trace segments 220.

In an embodiment, for a same second touch channel 120, two ends of the second touch channel 120 are connected to the touch drive circuit 320 through the second signal trace 220 respectively. The widths of at least part of the second signal traces 220 are positively correlated with the second length. The second length is a total length of the second signal trace 220 connected to the two ends of the second touch channel 120.

In an embodiment, the touch sensor includes a plurality of sets of second signal traces 220, and each set of second signal traces 220 includes at least one second signal trace 220. The plurality of sets of second signal traces 220 include at least a third set of signal traces and a fourth set of signal traces. A length difference between the second signal traces 220 in each set is less than a length threshold. Widths of the second signal traces 220 in a same set are the same. Lengths of the second signal traces 220 in the third set of signal traces are greater than those of the second signal traces 220 in the fourth set of signal traces, and widths of the second signal traces 220 in the fourth set of signal traces are greater than those of the second signal traces 220 in the third set of signal traces.

In an embodiment, the second resistance mismatch degree is a ratio of a second maximum resistance difference to a minimum value among the second resistances. The second maximum resistance difference is a difference between a maximum value among the second resistances and the minimum value among the second resistances. Specifically, the second resistance mismatch degree may be expressed by a mathematical expression as: $\lambda R_2 = (R2max - R_{2min})/R_{2min}$, where $\lambda R_2$ denotes the second resistance mismatch degree, $R_{2max}$ denotes the maximum value among the second resistances corresponding to the plurality of second touch channels 120, and $R_{2min}$ denotes the minimum value among the second resistances corresponding to the plurality of second touch channels 120.

In an embodiment, the resistance mismatch degree threshold ranges from 1% to 50%, which may be, for example, 10%, 20%, 25%, 30%, 35%, 40%, or the like, or any other values ranging from 1% to 50%. That is, the second resistance mismatch degree between the second resistances corresponding to the plurality of second touch channels 120 is less than or equal to 1% to 50%, which may be, for example, 10%, 20%, 25%, 30%, 35%, 40%, or the like, or any other values ranging from 1% to 50%. It may be understood that a second resistance match degree between the second resistances corresponding to the plurality of second touch channels 120 is equal to a difference between one and the second resistance mismatch degree. For example, if the second resistance mismatch degree between the second resistances corresponding to the plurality of second touch channels 120 is less than or equal to 1%, the second resistance match degree between the plurality of second resistances is greater than or equal to 99%.

In an embodiment, the width of the second signal trace 220 ranges from 5 μm to 100 μm. For example, the width of the second signal trace 220 may be 10 μm, 25 μm, 50 μm, 75 μm, 90 μm, or the like, or any other suitable value from 5 μm to 100 μm. Based on this, the width of the second signal trace 220 may be adjusted within a certain range, so as to increase the resistance match degree between the second resistances corresponding to the plurality of the second touch channels 120, thereby improving the touch performance of the touch sensor. In the application, the width of the second signal trace 220 may be specifically determined according to factors such as process technology, product size, and the requirement of the touch drive circuit 320.

In an embodiment, the second capacitance mismatch degree is a ratio of a second maximum capacitance difference to a minimum value among the second capacitances corresponding to the plurality of second touch channels 120. The second maximum capacitance difference is a difference between a maximum value among the second capacitances corresponding to the plurality of second touch channels 120 and the minimum value among the second capacitances corresponding to the plurality of second touch channels 120. Specifically, it may be expressed by a mathematical expression as: $\lambda C_2 = (C_{2max} - C_{2min})/C_{2min}$, where $\lambda C_2$ denotes the second capacitance mismatch degree, $C_{2max}$ denotes the maximum value among the second capacitances corresponding to the plurality of second touch channels 120, and $C_{2min}$ denotes the minimum value among the second capacitances corresponding to the plurality of second touch channels 120.

In an embodiment, the touch sensor includes a plurality of pairs of second signal traces 220, and each pair of second signal traces 220 includes two second signal traces 220 arranged adjacently. The plurality of pairs of second signal traces 220 include a third pair of signal traces and a fourth pair of signal traces, a maximum length of the two adjacent second signal traces 220 in the third pair of signal traces is greater than that of the two adjacent second signal traces 220 in the fourth pair of signal traces, and a spacing between the two adjacent second signal traces 220 in the third pair of signal traces is greater than that between the two adjacent second signal traces 220 in the fourth pair of signal traces.

In an embodiment, for a same pair of signal traces, a spacing between two adjacent second signal traces 220 in a pair of signal traces is positively correlated with a width of at least one second signal trace 220 in the pair of signal traces. Exemplarily, a spacing between two adjacent second signal traces 220 in a pair of signal traces is the same as a width of any second signal trace 220 in the pair of signal traces, or is an average value of widths of the two adjacent second signal traces 220 in the pair of signal traces.

In an embodiment, the capacitance mismatch degree threshold ranges from 1% to 50%, which may be, for example, 10%, 20%, 25%, 30%, 35%, 40%, or the like, or any other values ranging from 1% to 50%. That is, the second capacitance mismatch degree between the second capacitances corresponding to the plurality of second touch channels 120 is less than or equal to 1% to 50%, which may be, for example, 10%, 20%, 25%, 30%, 35%, 40%, or the like, or any other values ranging from 1% to 50%. It may be understood that a second capacitance match degree between the second capacitances corresponding to the plurality of second touch channels 120 is equal to a difference between one and the second capacitance mismatch degree. For example, if the second capacitance mismatch degree between the second capacitances corresponding to the plurality of second touch channels 120 is less than or equal to 10%, the second capacitance mismatch degree between the plurality of second capacitances is greater than or equal to 90%.

In an embodiment, a spacing between two adjacent second signal traces 220 in a pair of signal traces ranges from 5 μm to 200 μm. For example, the spacing may be 10 μm, 20 μm, 25 μm, 50 μm, 60 μm, 75 μm, 90 μm, 100 μm, 120 μm, 150 μm, 180 μm, or the like, or any other suitable value from 5 μm to 200 μm. Based on this, the spacing between two adjacent second signal traces 220 in a pair of signal traces may be adaptively adjusted within a certain range, so as to further increase, on the basis of mutual matching between the plurality of second resistances, the capacitance match degree between the second capacitances corresponding to the plurality of the second touch channels 120, and increase an impedance match degree corresponding to the plurality of second touch channels 120, thereby improving touch performance of the touch sensor. In the application, the spacing between two adjacent second signal traces 220 in a pair of signal traces may be specifically determined according to factors such as process technology, product size, and the requirement of the touch drive circuit 320.

The manner of setting the width of the first signal traces 210 corresponding to the first touch channels 110 and setting the spacings between two adjacent first signal traces 210 is also applicable to the second signal traces 220. That is, the width of the second signal trace 220 and the spacing between two adjacent second signal traces 220 may be adaptively set using the implementations provided in the foregoing embodiments, which may be obtained with reference to the foregoing content and is not described in detail herein.

In an embodiment, the plurality of first touch channels 110 respectively extend along a first direction and are arranged along a second direction, and the plurality of second touch channels 120 respectively extend along the second direction and are arranged along the first direction. Exemplarily, the first touch channel 110 and the second touch channel 120 have metal mesh (MM) structures. For example, in FIG. 1, the first touch channel 110 is a touch channel formed by driving electrodes Tx, and the second touch channel 120 is a touch channel formed by sensing electrodes Rx. The first touch channels 110 extend along the X-axis direction and are arranged at intervals along the Y-axis direction. The second touch channels 120 extend along the Y-axis direction and are arranged at intervals along the X-axis direction. The X-axis and the Y-axis are perpendicular. The first touch channel 110 and the second touch channel 120 have MM structures.

The touch drive circuit 320 is located at a first side of the touch area 10 in the second direction. Based on this, the plurality of first signal traces 210 are located at at least one side of the touch area 10 in the first direction and at the first side of the touch area 10 in the second direction. That is, the first signal trace 210 extends from a position where the touch drive circuit 320 is located to at least one end of the first touch channel 110. Exemplarily, the plurality of first signal traces 210 are located at the first side of the touch area 10 in the second direction and are located at the first side or second side of the touch area 10 in the first direction. The first side and the second side in the first direction are two opposite sides in the first direction. The plurality of second signal traces 220 are located at at least one side of the touch area 10 in the first direction and on two opposite sides of the touch area 10 in the second direction. That is, the second signal trace 220 extends from the position where the touch drive circuit 320 is located to at least one end of the second touch channel 120. Exemplarily, the plurality of second signal traces 220 are located at the first side and the second side of the touch area 10 in the second direction and are located at the first side or the second side in the first direction. The first side and the second side in the second direction are two opposite sides in the second direction. Taking the structure shown in FIG. 1 as an example, the first signal trace 210 is located at a lower side of the touch area 10 in the Y-axis direction and at the left and right sides in the X-axis direction, and the second signal traces 220 are located at upper and lower sides of the touch area 10 in the Y-axis direction and at the left and right sides in the X-axis direction. That is, a 2T2R drive structure is used in FIG. 1.

It is to be noted that FIG. 1 is merely exemplary. In an actual application, a corresponding driving structure such as 1T1R, 1T2R, 2T1R, or 2T2R may be selected according to a touch type of the touch sensor, so that trace areas of the first signal traces 210 and the second signal traces 220 are correspondingly set, which is not specifically limited herein.

In an embodiment, still referring to FIG. 1, the width of the first signal trace 210 is positively correlated with the length of the first signal trace 210. The widths of the second signal traces 220 are the same. It may be understood that, for the structure shown in FIG. 1, the second signal traces 220 are routed from a central axis of the touch area 10 in the first direction to two sides. Therefore, a length difference between the second signal traces 220 connected to the second touch channels 120 is small, and an overall length of the second signal trace 220 is large. Therefore, the second resistance mismatch degree between the second resistances corresponding to the second touch channel 120 is small. The first signal traces 210 connected to the first touch channel 110 are routed from the first side in the second direction to two sides in the first direction. Compared with the second signal trace 220, the overall length of the first signal trace 210 is smaller. Therefore, a length difference between the first signal traces 210 has a greater impact on the difference between the first resistances. That is, to make sure that the first resistance mismatch degree between the first touch channels 110 is greater than the resistance mismatch degree threshold, the widths and spacings of the first signal traces 210 are adjusted according to the lengths of the first signal traces 210. Meanwhile, the widths and spacings of the second signal traces 220 can keep unchanged, while keeping the second resistance mismatch degree between the second touch channels 120 less than or equal to the resistance mismatch degree threshold, i.e., the widths and spacings of the second signal trace 220 are set to the same value.

According to the touch sensor provided in the embodiments of the present disclosure, an adjustment principle for the widths of the signal traces (including the first signal traces 210 and the second signal traces 220) and the spacing between two adjacent signal traces is that impedances corresponding to the first touch channels 110 match each other and impedances between the second touch channels 120 match each other. That is, the first resistance mismatch degree between the plurality of first resistances and the second resistance mismatch degree between the plurality of second resistances are respectively less than or equal to the resistance mismatch degree threshold, and the first capacitance mismatch degree between the plurality of first capacitances and the second capacitance mismatch degree between the plurality of second capacitances are respectively less than or equal to the capacitance mismatch degree threshold.

In an embodiment, still referring to FIG. 1, the first signal traces 210 include first signal traces A 211 and first signal traces B 212. A first end of each first touch channel 110 is connected to the touch drive circuit 320 through the first signal trace A 211, and a second end of each first touch channel 110 is connected to the touch drive circuit 320 through the first signal trace B 212. The first signal traces A 211 connected to the first touch channels 110 are different from each other, and the first signal traces B 212 connected to the first touch channels 110 are different from each other. Exemplarily, the first signal trace A 211 and the first signal trace B 212 are symmetrically arranged relative to the second direction. For example, in FIG. 1, the first signal traces A 211 are located at a lower side of the touch area 10 in the Y-axis direction and at the left side in the X-axis direction, and the first signal traces B 212 are located at the lower side of the touch area 10 in the Y-axis direction and at the right side in the X-axis direction. The first resistance corresponding to each first touch channel includes a channel resistance corresponding to the first touch channel 110, a trace resistance of the first signal trace A 211 connected to the first touch channel 110, and a trace resistance of the first signal trace B 212 connected to the first touch channel 110.

Exemplarily, the second signal traces 220 include second signal traces A 221 and second signal traces B 222. A first end of each second touch channel 120 is connected to a second touch drive circuit through the second signal trace A 221, a second end of each second touch channel 120 is connected to the second touch drive circuit through the second signal trace B 222. The second signal traces A 221 connected to the second touch channels 120 are different from each other, and the second signal traces B 222 connected to the second touch channels 120 are different from each other. Exemplarily, the second signal trace A 221 and the second signal trace B 222 are symmetrically arranged relative to the second direction. For example, in FIG. 1, the second signal traces A 221 are located on upper and lower sides of the touch area 10 in the Y-axis direction and on the left side in the X-axis direction, and the second signal traces B 222 are located on the upper and lower sides of the touch area 10 along the Y-axis direction and on the right side along the X-axis direction. The second resistance corresponding to each second touch channel includes a channel resistance corresponding to the second touch channel 120, a trace resistance of the second signal trace A 221 connected to the second touch channel 120, and a trace resistance of the second signal trace B 222 connected to the second touch channel 120.

Based on the above, two ends of the first touch channel 110 are connected to the touch drive circuit 320 through the first signal trace A 211 and the first signal trace B 212 respectively, and two ends of the second touch channel 120 are connected to the touch drive circuit 320 through the second signal trace A 221 and the second signal trace B 222 respectively, so that the touch drive circuit 320 drives the two ends of the first touch channel 110 and the second touch channel 120 respectively to support the touch function.

In an embodiment, the first touch channel 110 is a channel for capacitive touch or a channel for electromagnetic touch, or a channel for capacitive touch and electromagnetic touch. The second touch channel 120 is a channel for capacitive touch or a channel for electromagnetic touch, or a channel for capacitive touch and electromagnetic touch. The first touch channel 110 and the second touch channel 120 have a same touch type. That is, the first touch channel 110 and the second touch channel 120 may be channels for capacitive touch or channels for electromagnetic touch, or channels for capacitive touch and electromagnetic touch. In the application, the first touch channel 110 and the second touch channel 120 are used in conjunction. Based on this, the touch sensor provided in the embodiments of the present disclosure can support capacitive touch or electromagnetic touch, and is compatible with capacitive touch and electromagnetic touch. An appropriate touch type can be flexibly designed according to an actual touch requirement.

In an embodiment, a touch device is provided. The touch device includes the touch sensor as described above. Exemplarily, the touch device includes at least one of a capacitive touch device and an electromagnetic touch device. The capacitive touch device refers to a device that uses a capacitive touch technology to support the touch function. In the application, touch interaction may be achieved by using a touch input tool such as a finger. The electromagnetic touch device refers to a device that uses electromagnetic touch technology to support the touch function. In the application, touch interaction and electromagnetic touch may be achieved by using a touch input tool such as a stylus.

Based on the touch sensor and the touch device provided in the above embodiments of the present disclosure, taking the structure shown in FIG. 1 as an example, Table 2 and Table 3 provide test data before and after adjustment of two adjacent first touch channels Tx1 and Tx40. As can be seen from Table 2 and Table 3, the length of the first signal trace corresponding to the first touch channel Tx1 is 237.5 μm, the length of the first signal trace corresponding to the first touch channel Tx40 is 97 μm, and a length difference between the two is (237.5–97)=140.5 μm. In this regard, the first resistance mismatch degree and the first capacitance mismatch degree between the first touch channels Tx1 and Tx40 are required to be less than or equal to 20% respectively.

Figure 5:
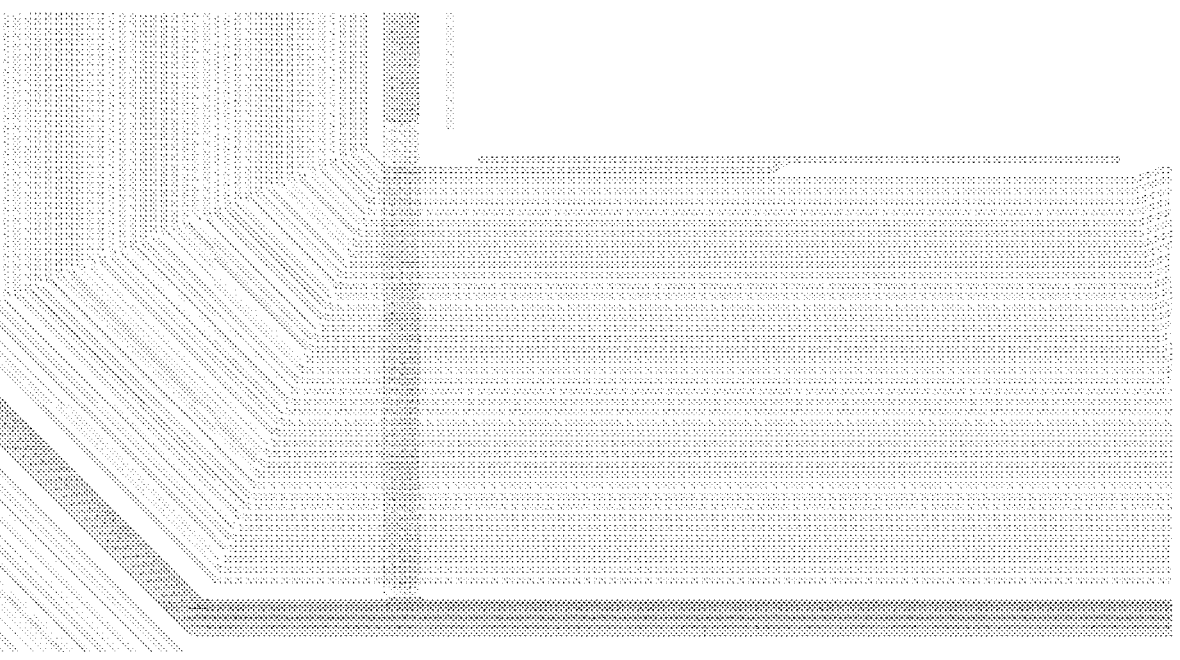
FIG. 5 is a schematic structural diagram of a touch sensor without adjusting a line width and a line spacing according to an embodiment.

(1) Before Improvement, as Shown in FIG. 5

The trace resistance corresponding to the first touch channel Tx1 is 1131Ω, and the trace resistance corresponding to the first touch channel Tx40 is 462Ω, a trace resistance difference between the two channels is (1131-462)=669Ω, and channel resistances of the first touch channels Tx1 and Tx40 are the same by default, both of which are 1991Ω. Therefore, the first resistance mismatch degree between the first touch channels Tx1 and Tx40 is (3122–2453)/2453=27.3%.

touch channels Tx1 and Tx40 are the same by default, both of which are 80 pF. Therefore, the first resistance mismatch degree between the first touch channels Tx1 and Tx40 is (99.5–88.0)/88=13.1%.

Figure 6:
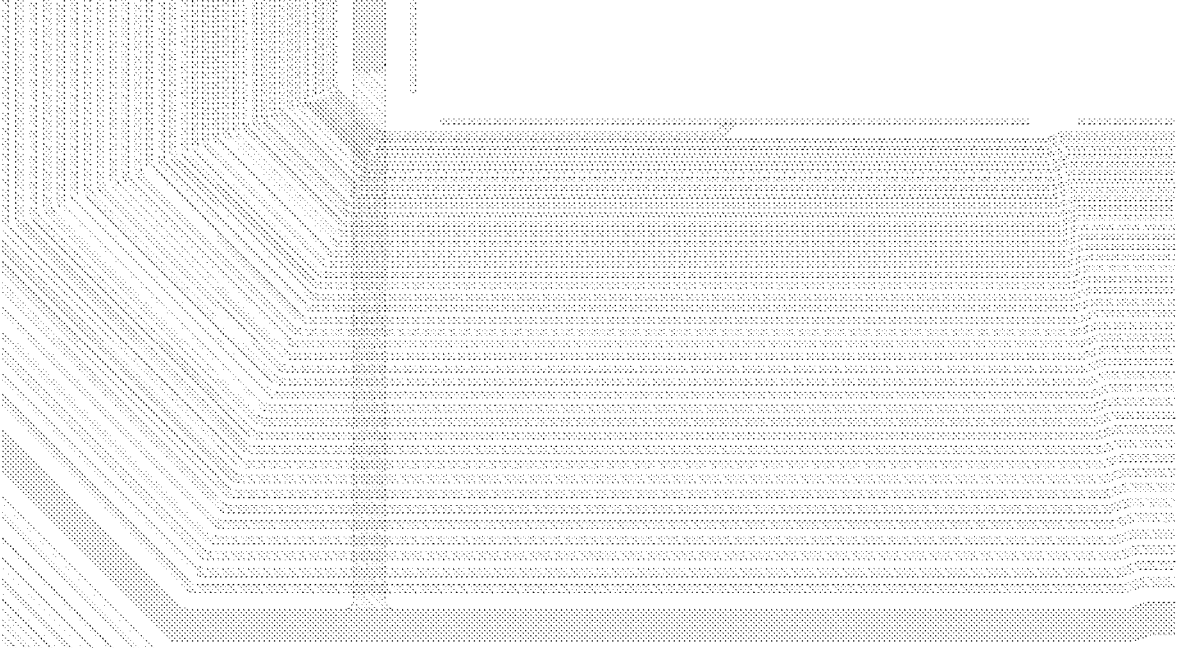
FIG. 6 is a schematic structural diagram of the touch sensor corresponding to FIG. 5 after the line width and the line spacing are adjusted according to an embodiment.

(2) after Improvement, as Shown in FIG. 6

Firstly, the widths of the first signal traces of the first touch channels Tx1 and Tx40 are adjusted respectively. In accordance with the above-described manner, the overall width of the first signal trace connected to the first touch channel Tx1 is adjusted to 51 μm, and the overall width of the first signal trace connected to the first touch channel Tx40 is adjusted to 21 μm. In this way, the trace resistance of the first signal trace connected to the first touch channel Tx1 becomes 665Ω, and the trace resistance of the first signal trace connected to the first touch channel Tx40 becomes 660Ω. Therefore, the first resistance mismatch degree between the first touch channels Tx1 and Tx40 is reduced to (2656–2651)/2651=0.2%, less than or equal to 20%.

Secondly, the spacings of the first signal traces of the first touch channels Tx1 and Tx40 are adjusted respectively. In accordance with the above-described manner, the spacing between the first signal trace connected to the first touch channel Tx1 and the first signal trace adjacent thereto is adjusted to 51 μm, and the spacing between the first signal trace connected to the first touch channel Tx40 and the first signal trace adjacent thereto is adjusted to 21 μm. In this way, the parasitic capacitance of the first signal trace connected to the first touch channel Tx1 becomes 19.2 pF, and the parasitic capacitance of the first signal trace connected to the first touch channel Tx40 becomes 8.1 pF. Therefore, the first capacitance mismatch degree between the first touch channels Tx1 and Tx40 is reduced to (99.2–88.1)/88.1=12.6%, less than or equal to 20%.

TABLE 2

| | Channel | Line width W (μm) | Line spacing D (μm) | Line length L (μm) | $R_{trace1}$ | $R_{mesh1}$ | $R_1$ | $\lambda R_1$ |
|---|---|---|---|---|---|---|---|---|
| Before improvement | Tx1 | 30 | 30 | 237.5 | 1131 | 1991 | 3122 | 27.3% |
| | Tx40 | 30 | 30 | 97 | 462 | 1991 | 2453 | |
| After improvement | Tx1 | 51 | 51 | 237.5 | 665 | 1991 | 2656 | 0.2% |
| | Tx40 | 21 | 21 | 97 | 660 | 1991 | 2651 | |

TABLE 3

| | Channel | Line width W (μm) | Line spacing D (μm) | Line length L (μm) | $C_{trace1}$ | $C_{mesh1}$ | $C_1$ | $\lambda C_1$ |
|---|---|---|---|---|---|---|---|---|
| Before improvement | Tx1 | 30 | 30 | 237.5 | 19.5 | 80 | 99.5 | 13.1% |
| | Tx40 | 30 | 30 | 97 | 8.0 | 80 | 88.0 | |
| After improvement | Tx1 | 51 | 51 | 237.5 | 19.2 | 80 | 99.2 | 12.6% |
| | Tx40 | 21 | 21 | 97 | 8.1 | 80 | 88.1 | |

The parasitic capacitance between the first signal traces corresponding to the first touch channel Tx1 is 19.5 pF, and the parasitic capacitance between the first signal traces corresponding to the first touch channel Tx40 is 8.0 pF, a parasitic capacitance difference between the two channels is (19.5–8.0)=11.5 pF, and channel capacitances of the first It is to be noted that, as can be seen from the simulation data provided in Table 1, adjusting the line width alone may aggravate the parasitic capacitance difference. Therefore, the adjustment of the line spacing is partly to eliminate the total capacitance mismatch caused by lengths of traces at edges, and is partly to eliminate the total capacitance mismatch caused by the adjustment of the line width. If an original total capacitance difference is within an allowable range and a total capacitance difference exceeds the allowable range after the adjustment of the line width, it is preferable to adjust the line spacing to realize the original total capacitance. If the original total capacitance difference is not within the allowable range, the line spacing is adjusted such that the total capacitance enters the allowable range. If the original total capacitance difference is within the allowable range and the total capacitance difference is still within the allowable range after the adjustment of the line width, the line spacing is not adjusted.

In the description of the specification, the description with reference to the terms such as "some embodiments" and "other embodiments" mean that a particular feature, structure, material, or characteristic described in connection with the embodiment or example is included in at least one embodiment or example of the present disclosure. In the specification, the schematic descriptions of the above terms are not necessarily referring to the same embodiment or example.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the protection scope of the present disclosure should be subject to the appended claims.

What is claimed is:

1. A touch sensor, wherein the touch sensor comprises:
   a touch area comprising at least a plurality of first touch channels; and
   a non-touch area located at a side of the touch area, the non-touch area comprising at least a plurality of first signal traces, wherein the first signal traces connected to the first touch channels are different from each other,
   wherein a first resistance mismatch degree between first resistances corresponding to the plurality of first touch channels is less than or equal to a resistance mismatch degree threshold, and/or a first capacitance mismatch degree between first capacitances corresponding to the plurality of first touch channels is less than or equal to a capacitance mismatch degree threshold; and
   the first resistance comprises a channel resistance of the first touch channel, and a trace resistance of the first signal trace connected to the first touch channel, and the first capacitance comprises a channel capacitance of the first touch channel, and a parasitic capacitance between the first signal trace connected to the first touch channel and the remaining first signal traces.

2. The touch sensor according to claim 1, wherein a width of at least a portion of at least part of the first signal traces is positively correlated with a length of the first signal trace.

3. The touch sensor according to claim 2, wherein the first signal trace comprises at least a plurality of signal trace segments, and wherein for a same first signal trace, a width of a target signal trace segment is positively correlated with the length of the first signal trace, and widths of the remaining signal trace segments are the same and less than the width of the target signal trace segment, wherein the target signal trace segment comprises at least one of the plurality of signal trace segments.

4. The touch sensor according to claim 2, wherein for a same first touch channel, two ends of the first touch channel are respectively connected to a touch drive circuit through the first signal trace, and a width of at least part of the first signal traces is positively correlated with a first length of the same first signal trace, the first length being a total length of the first signal trace connected to the two ends of the first touch channel.

5. The touch sensor according to claim 1, wherein the touch sensor comprises a plurality of sets of first signal traces, each set comprising at least one first signal trace, a length difference between the first signal traces in each set is less than a length threshold, and widths of the first signal traces in a same set are the same, and
   wherein the plurality of sets of first signal traces comprise at least a first set of signal traces and a second set of signal traces, lengths of the first signal traces in the first set of signal traces are greater than those of the first signal traces in the second set of signal traces, and widths of the first signal traces in the first set of signal traces are greater than those of the first signal traces in the second set of signal traces.

6. The touch sensor according to claim 1, wherein the resistance mismatch degree threshold ranges from 1% to 50%, and a width of the first signal trace ranges from 5 μm to 100 μm.

7. The touch sensor according to claim 1, wherein the first resistance mismatch degree is a ratio of a first maximum resistance difference to a minimum value among the plurality of first resistances, wherein the first maximum resistance difference is a difference between a maximum value among the plurality of first resistances and the minimum value among the plurality of first resistances.

8. The touch sensor according to claim 1, wherein at least part of pairs of adjacent first signal traces defines a spacing, and at least a portion of the spacing is positively correlated with a length of at least one first signal trace of the pair of the first signal traces.

9. The touch sensor according to claim 1, wherein the capacitance mismatch degree threshold ranges from 1% to 50%, and a spacing between two adjacent first signal traces ranges from 5 μm to 200 μm.

10. The touch sensor according to claim 1, wherein the first capacitance mismatch degree is a ratio of a first maximum capacitance difference to a minimum value among the plurality of first capacitances, wherein the first maximum capacitance difference is a difference between a maximum value among the plurality of first capacitances and the minimum value among the plurality of first capacitances.

11. The touch sensor according to claim 2, wherein in each two adjacent first signal traces, a spacing between the two adjacent first signal traces is positively correlated with a width of at least one of the two adjacent first signal traces.

12. The touch sensor according to claim 11, wherein in each two adjacent first signal traces, the spacing between the two adjacent first signal traces is greater than or equal to a width of one of the two adjacent first signal traces.

13. The touch sensor according to claim 1, wherein the touch area further comprises a plurality of second touch channels, and the first touch channels and the second touch channels have different channel types;

the non-touch area further comprises second signal traces, wherein each of the second touch channels is connected to a touch drive circuit through the second signal trace, and the second signal traces connected to the second touch channels are different from each other;

a second resistance mismatch degree between second resistances corresponding to the plurality of second touch channels is less than or equal to the resistance mismatch degree threshold, and/or a second capacitance mismatch degree between second capacitances corresponding to the plurality of second touch channels is less than or equal to the capacitance mismatch degree threshold; and the second resistance comprises a channel resistance of the second touch channel, and a trace resistance of the second signal trace connected to the second touch channel, and the second capacitance comprises a channel capacitance of the second touch channel, and a parasitic capacitance between the second signal trace connected to the second touch channel and the remaining second signal traces.

14. The touch sensor according to claim 13, wherein the plurality of first touch channels extend along a first direction respectively and are arranged along a second direction, and the plurality of second touch channels extend along the second direction respectively and are arranged along the first direction, and wherein the plurality of first signal traces are located at at least one side of the touch area in the first direction and at a first side of the touch area in the second direction; and the plurality of second signal traces are located at at least one side of the touch area in the first direction and at two opposite sides of the touch area in the second direction, wherein the touch drive circuit is located at the first side of the touch area in the second direction.

15. The touch sensor according to claim 14, wherein widths of the first signal traces are positively correlated with lengths of the first signal traces, and widths of the second signal traces are the same.

16. The touch sensor according to claim 1, wherein the first signal traces comprise first signal traces A and first signal traces B, a first end of each of the first touch channels is connected to a touch drive circuit through the first signal trace A, a second end of each of the first touch channels is connected to the touch drive circuit through the first signal trace B, the first signal traces A connected to the first touch channels are different from each other, and the first signal traces B connected to the first touch channels are different from each other, and wherein the first resistance corresponding to each of the first touch channels comprises a channel resistance corresponding to the first touch channel, a trace resistance of the first signal trace A connected to the first touch channel, and a trace resistance of the first signal trace B connected to the first touch channel.

17. The touch sensor according to claim 1, wherein the first touch channel comprises a capacitive touch channel and/or an electromagnetic touch channel.

18. A touch device, comprising a touch sensor, wherein the touch sensor comprises:

a touch area comprising at least a plurality of first touch channels; and a non-touch area located at a side of the touch area, the non-touch area comprising at least a plurality of first signal traces, wherein the first signal traces connected to the first touch channels are different from each other, and wherein a first resistance mismatch degree between first resistances corresponding to the plurality of first touch channels is less than or equal to a resistance mismatch degree threshold, and/or a first capacitance mismatch degree between first capacitances corresponding to the plurality of first touch channels is less than or equal to a capacitance mismatch degree threshold; and the first resistance comprises a channel resistance of the first touch channel, and a trace resistance of the first signal trace connected to the first touch channel, and the first capacitance comprises a channel capacitance of the first touch channel, and a parasitic capacitance between the first signal trace connected to the first touch channel and the remaining first signal traces.

19. The touch device according to claim 18, wherein a width of at least a portion of at least part of the first signal traces is positively correlated with a length of the first signal trace.

20. The touch device according to claim 19, wherein the first signal trace comprises at least a plurality of signal trace segments, and wherein for a same first signal trace, a width of a target signal trace segment is positively correlated with the length of the first signal trace, and widths of the remaining signal trace segments are the same and less than the width of the target signal trace segment, wherein the target signal trace segment comprises at least one of the plurality of signal trace segments.

* * * * *